April 9, 1940.   F. NEUGEBAUER   2,196,563
ARRANGEMENT FOR DRIVING THE PROPELLER OF AN AIRCRAFT
Filed Dec. 2, 1938   2 Sheets-Sheet 1

Inventor
Franz Neugebauer,

By Bailey & Carson
Attorneys

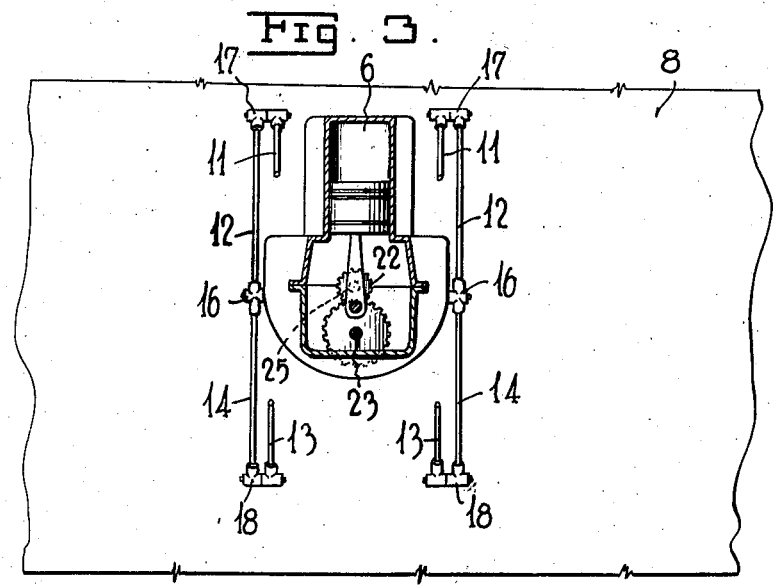
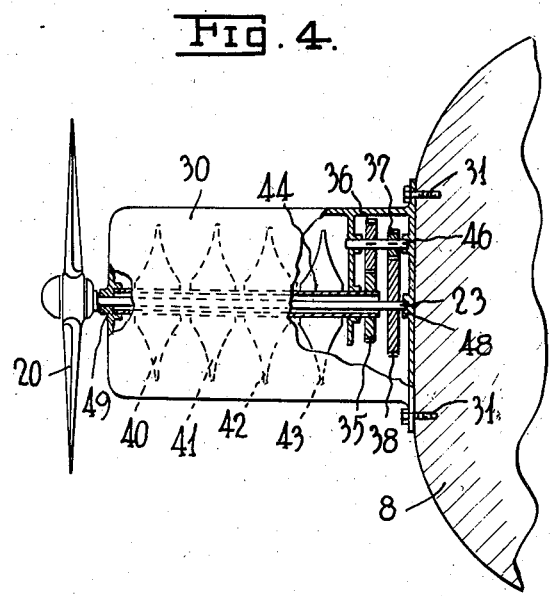

Patented Apr. 9, 1940

2,196,563

UNITED STATES PATENT OFFICE 2,196,563

ARRANGEMENT FOR DRIVING THE PROPELLER OF AN AIRCRAFT

Franz Neugebauer, Allach, near Munich, Germany, assignor to Junkers Flugzeug-und-Motorenwerke Aktiengesellschaft, a corporation of Germany Application December 2, 1938, Serial No. 243,678
In Germany December 10, 1937

4 Claims. (Cl. 244—54)

This invention relates to an arrangement for driving the propeller of an aircraft in such a manner that the engine load is transmitted to the propeller shaft at a point adjacent to that at which the engine housing is rigidly supported against distortion.

It has been customary to mount engines forwardly of the fuselage or the wings of an airplane with the propeller disposed in front of the engine and mounted on a special shaft journalled in the engine housing and connected with the crank shaft of the motor by reduction gearing. The reduction gearing has been disposed in the engine housing directly adjacent the propeller, that is at the extreme front of the engine housing.

Such an arrangement is not satisfactory because the reaction moment of the drive is transmitted rearwardly through the engine housing to the part of the aircraft supporting the engine. This reaction moment exerts twisting or torsional strains on the housing at a point which is relatively distant from that at which the housing is positively connected to the supporting part of the aircraft.

The engine housing, however, is extremely sensitive to torsional strains because such deformations give rise to moments of the individual parts relative to each other and thus results in a loosening of the parts and the packing.

Attempts have been made to obviate this defect. Such attempts have usually consisted of making the engine housing particularly rigid and strong so that it would better withstand and thus resist the torsional strains. Obviously, however, any steps to avoid the defect in that direction are inconsistent with the requirement that an aircraft engine should be as light as possible.

The principal object of the present invention is to provide an arrangement for driving an aircraft propeller wherein these defects are avoided.

It is an object of the invention to avoid these defects in such a manner as will not increase the weight of the engine housing or the supports therefor. In fact, according to the invention the housing may be less rigid and massive than hitherto.

According to the invention, this is accomplished by transmitting the engine load to the propeller shaft at a point adjacent that at which the engine housing is fixed or braced against distortion, that is, at and near the part of the housing secured to aircraft. The invention has this for an object.

These and other objects of the invention will be apparent from the following description and claims when read in conjunction with the accompanying drawings of exemplary embodiments of the invention and in which:

Fig. 3 is a cross sectional view on the line 3—3 of Fig. 1.

Fig. 4 is a diagrammatic elevation, partially in section, of another embodiment of the invention, in which the engine is constructed like a turbine.

Figure 1:
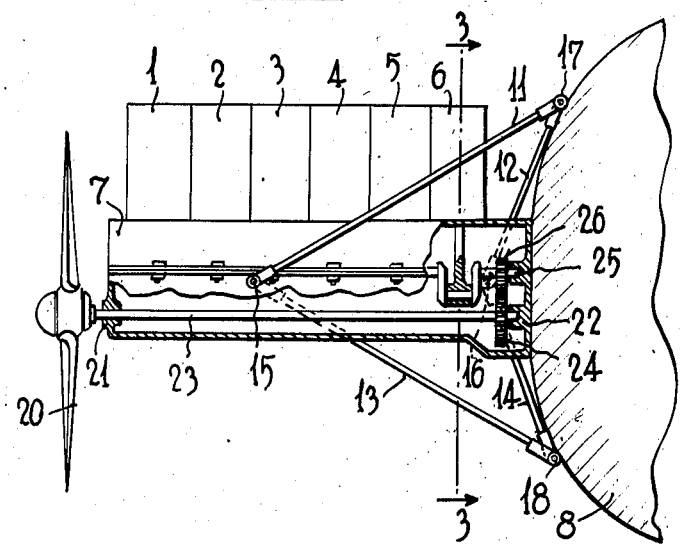
Fig. 1 is a diagrammatic elevation, partially in section, of an arrangement for driving the propeller of an aircraft in accordance with the invention.
Figure 2:
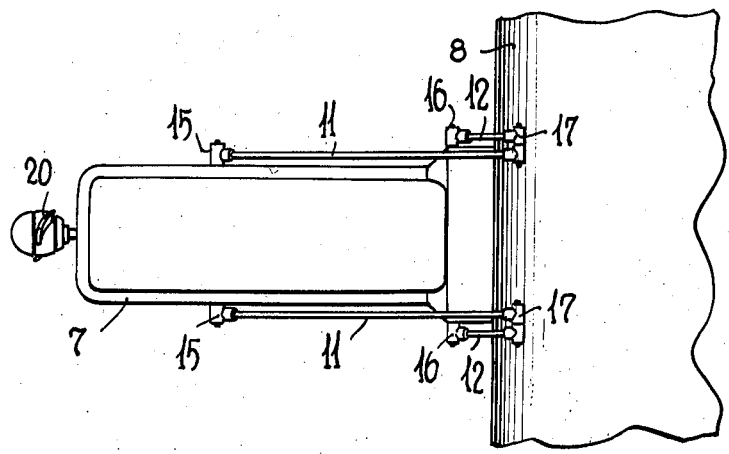
Fig. 2 is a plan view of the arrangement of Fig. 1.

With reference now to the embodiment of Figs. 1, 2 and 3, an internal combustion engine having cylinders 1, 2, 3, 4, 5 and 6 and a crank case 7 is disposed to extend forwardly from the supporting part 8 of the aircraft to which it is fixed. The supporting part of the aircraft may be the fuselage, or wing, or even some other part of the aircraft.

The engine is secured to aircraft by means of brace rods 11, 12, 13 and 14, there being pairs of each of these, one on each side of the engine. The brace rods 11 are connected to the engine casing by the attaching members 15 at their outer ends, and at their inner ends are secured to the supporting part of the aircraft by the attaching members or supports 17. The brace rods 13 are likewise connected to the engine casing by the attaching members 15, but their inner ends are secured to the supporting part of the aircraft by the attaching members or supports 18.

The brace rods 12 are secured to the engine casing by the attaching members 16 which are disposed near the inner end of the engine casing. At their inner ends the brace rods 12 are secured to the supports 17. The brace rods 14 are also secured at their outer ends to the attaching members 16 but their inner ends are secured to the supporting members 18.

The members 11 and 12 are traction members, and the members 13 and 14 are pressure rods. All of these rods may be arranged like turnbuckles.

The propeller 20 is mounted on a shaft 23 extending longitudinally through the lower portion of the crank shaft housing 7. The shaft 23 is journalled in the bearings 21 and 22 rigidly mounted in the housing 7.

The load of the engine is transmitted to the propeller shaft 23 from the crank shaft 25 through reduction gearing 26, 24, the gear 26 being mounted near the inner end of the crank shaft 25 and the gear 24 being mounted on the propeller shaft 23. These gears mesh.

It will be noted that with this arrangement the reaction moment of the reduction gear drive takes place directly adjacent or in the vicinity of the point at which the engine housing is rigidly supported with respect to the supporting part of the aircraft, and at which point distortion caused by torque is prevented. This moment thus is not transmitted throughout the entire crank shaft housing as heretofore, and in accordance with the invention does not and cannot exert and produce distorting strains over any considerable portion of its length and thus produce relative movement of the individual parts of the crank shaft and engine housing.

In the embodiment according to Fig. 4, the same principle is carried into effect. The turbine type engine 30 is secured to the supporting part 8 of the aircraft by means of retaining screws 31 engaging the engine housing 30.

The drive which transmits the load of the engine 30 to the propeller shaft 23, and which consists of the spur gears 35, 36 and 37, 38, is disposed in the part of the engine housing directed toward the supporting part 8, and adjacent the point at which the screws 31 engage the housing 30.

The engine shaft 44 carries the turbine blades and runners 40, 41, 42, 43 secured thereto and which are rotated with the shaft by a suitable force such as air, gas, steam, or the like from a source not shown. The shaft 44 is hollow and surrounds the propeller shaft 23. The hollow shaft 44 carries a gear 35 at its inner end which gear meshes with a gear 36 secured to the auxiliary shaft 46. Also mounted on the auxiliary shaft 46 is the gear 37 which meshes with the gear 38 near the inner end of the propeller shaft 23. The propeller shaft is journalled in the bearings 48, 49 of the engine housing.

As will be manifest, rotation of the shaft 44 caused by the action of force on the turbine blades or runners, drives the propeller shaft 23 through gears 35, 36, 37 and 38.

As in the first embodiment, this arrangement is substantially free from distortional strains through the reaction moment of the drive.

It will be obvious that various changes may be made in the embodiments shown without departing from the spirit of the invention. For example, the embodiment of Fig. 4 could employ the brace rods 11, 12, 13 and 14 of Figs. 1, 2 and 3 either alone or together with the screw attachment 31 of Fig. 4. Likewise the screw attachment 31 of Fig. 4 could be used in the embodiment of Figs. 1, 2 and 3 either alone or together with the brace rods 11, 12, 13 and 14. Other changes will suggest themselves. I wish it understood, however, that I do not intend to be limited to the embodiments illustrated and described except as indicated in the following claims.

Having now described my invention, what I claim as new and desire to secure by Letters Patent of the United States is:

1. An arrangement for driving aircraft, comprising an engine mounted on a supporting part of the aircraft to extend outwardly from said part, a propeller shaft extending substantially the length of the engine, a propeller mounted on the outer end of said propeller shaft, and means operatively connecting the propeller shaft with the engine substantially near the supporting part of the aircraft.

2. An arrangement for driving aircraft, comprising an engine extending outwardly from a supporting part of the aircraft, bracing means for securing the engine to said supporting part, a propeller shaft extending substantially the length of the engine, a propeller mounted on the outer end of said propeller shaft, and means operatively connecting the propeller shaft with the engine near that point at which that engine is most rigidly braced against movement with respect to the supporting part of the aircraft.

3. An arrangement for driving aircraft, comprising an engine mounted on a supporting part of the aircraft to extend outwardly from said part, a propeller shaft extending substantially the length of the engine, a propeller mounted on the outer end of said propeller shaft, and means operatively connecting the propeller shaft with the engine at a point within that half of the engine closest to said supporting part.

4. An arrangement for driving aircraft, comprising a housing mounted on a supporting part of an aircraft to extend forwardly from said part, said housing enclosing an engine and a shaft adapted to be driven thereby, and a propeller shaft extending longitudinally therethrough, a propeller mounted on the outward end of said propeller shaft, and means disposed within the housing in the vicinity of the part thereof nearest the supporting part of the aircraft for operatively connecting said first shaft and said propeller shaft, whereby the reaction moment of the drive is transmitted to said propeller shaft at a point where the housing is rigidly secured to the supporting part of the aircraft and torsional strains caused by said reaction moment are prevented from being transmitted to said supporting part.

FRANZ NEUGEBAUER.